US006871227B2

(12) United States Patent
Allen

(10) Patent No.: US 6,871,227 B2
(45) Date of Patent: Mar. 22, 2005

(54) METHOD AND SYSTEM OF TELECOMMUNICATIONS TRACE DIAGNOSTICS BY MULTIPLE USERS

(75) Inventor: Dowell Allen, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 838 days.

(21) Appl. No.: 09/741,230

(22) Filed: Dec. 20, 2000

(65) Prior Publication Data

US 2002/0078195 A1 Jun. 20, 2002

(51) Int. Cl.[7] ............................................. G06F 15/173
(52) U.S. Cl. ....................... 709/224; 709/223; 709/201; 714/37
(58) Field of Search ................................ 709/201, 203, 709/223, 224, 202, 204; 714/37, 39

(56) References Cited

U.S. PATENT DOCUMENTS

| | | | | |
|---|---|---|---|---|
| 5,678,042 A | * | 10/1997 | Pisello et al. .................. | 714/47 |
| 5,933,602 A | * | 8/1999 | Grover ........................ | 709/224 |
| 6,202,199 B1 | * | 3/2001 | Wygodny et al. ........... | 717/125 |
| 6,313,768 B1 | * | 11/2001 | Allen .......................... | 341/78 |
| 6,526,044 B1 | * | 2/2003 | Cookmeyer et al. ........ | 370/352 |
| 6,643,683 B1 | * | 11/2003 | Drumm et al. ............. | 709/203 |

OTHER PUBLICATIONS

Zinky et al, " Visualizing Packet traces", ACM SIGCOMM computer communication review, Oct. 1992 pp. 293–304.*

* cited by examiner

Primary Examiner—Glenton B. Burgess
Assistant Examiner—Yasin Barqadle

(57) ABSTRACT

A distributed system and method usable by multiple and concurrent users for decoding telecommunication tracer information originating from any telecommunication network element and utilizing any industry standard or proprietary telecommunication protocol. The distributed system can include a plurality of integrated trace analysis system application servers, each providing a CDL based decoding service, an encoding sub-system used to encode each telecommunication protocol into executable CDL programs or catalogs, and a decoder engine that uses signatures to determine the telecommunication protocol associated with each event in the trace data and invoke the appropriate executable CDL program to decode the tracer event. This set of decoding services coupled with administrative services comprises an integrated trace analysis system (or iTAS) engine that executes on the application server(s). A plurality of client workstations connected to the distributed network each have a browser based graphical user interface that displays the decoded output results from the decoder engine and is also used for administration of the system. Further, the application servers can be configured to reside in a particular domain and each application server within that domain can be administered from any of the client workstations in the domain.

8 Claims, 4 Drawing Sheets

METHOD AND SYSTEM OF TELECOMMUNICATIONS TRACE DIAGNOSTICS BY MULTIPLE USERS

CROSS-REFERENCE TO RELATED APPLICATIONS

This application is related in subject matter to co-pending U.S. patent applications Ser. No. 09/540,184 filed Mar. 31, 2000, by Dowell Allen for "Method and System of Encoding and Decoding Telecommunication Tracer Information," and Ser. No. 09/540,183 filed Mar. 31, 2000, by Dowell Allen for "System and Method for Trace Diagnostics of Telecommunications Systems," and assigned to a common assignee herewith. Co-pending U.S. patent applications Ser. No. 09/540,184 and Ser. No. 09/540,183, are incorporated herein by reference.

DESCRIPTION BACKGROUND OF THE INVENTION

1. Field of the Invention

The present invention generally relates to a system and method for telecommunication system trace diagnostics and, more particularly, to a system and method implemented in a distributed system for use by multiple users to troubleshoot telecommunications network elements such as a Siemens telephony switch, EWSD. By the use of this invention, multiple users can also have a common basis for collaborative work if desired. Telecommunications systems, as used herein, refers to any computer and/or telephone system, in a stand-alone or networked configuration, that is used to electronically communicate information.

2. Background Description

The swift advance of telecommunications technology over the latter half of the twentieth century promises a future in which a broad suite of services is available to the network user. These services cover a wide spectrum of activities encompassing traditional telephony and computer data transmission as well as the integration of these activities. The future user of telecommunications technology can expect digital telephony, high-speed data transmission, real-time video, high fidelity audio, and the combination of these activities into multimedia products all to be readily available over a network that interconnects users throughout the world.

In the first half of the twentieth century, telephony architecture developed along the lines of a circuit-switched network providing audio communication to potentially every person in the world. Then, Private Branch Exchanges (PBXs) that provide a local telephone network within a building but that also retain access to the larger global network were developed. PBXs represent an example of a network within a network.

With the advent of the personal computer in the 1970s, early computer network architectures were developed that led to the internetworking of computers in a manner analogous to the internetworking of telephones. Motivated by the desire to distribute resources among user's who may communicate with each other, Local Area Networks (LANs) were developed that allowed a local interconnection of computers were developed. They may be thought of as being analogous to the PBXs. The recognition that users within one LAN may wish to communicate with users in a separate LAN led to the development of Wide Area Networks (WANs), which may be thought of as a network of networks. Such networking of personal computers has led to new user services such as electronic mail and electronic file sharing.

Because modern telecommunications equipment, including everything from routers and switches to telephones and personal computers, comprises a wide range of purposes, the telecommunications and computer industries have formulated the Open Systems Interface (OSI) model to provide a basis for developing and coordinating standards for internetworking systems developed by a variety of vendors/users. This approach models the telecommunications process as a structure of seven layers. These layers address, in turn, the physical connection, the data link, network functions, transport and data flow, session management, presentation, and finally the application, as basic features of an end-to-end communication process. The basis for the workability of a telecommunications network is the set of rules for communicating known as the protocol. Various protocols exist for each layer of the OSI model. These protocols are required to connect different physical devices, for example, telephones and personal computers to multiple pipelines such as copper wire and fiber optics. These pipelines use a variety of switching approaches, for example, circuit switching and packet switching, each of which has different performance criteria in a wide variety of end-user applications, such as low latency for telephone systems and low error rates for computer-based data exchange systems.

In addition to the user-based network functions (e.g., transmission of voice or data), each network requires a system for controlling the network in a fashion transparent to the user. When a person picks up the telephone to place a call, for example, a signal is sent to a central office (CO) switch to alert it that a user wishes to make a call. A response is sent back to the user in the form of a dial tone to indicate that the required network resources are available. This communication, which is essentially invisible to the caller, is an example of the kind of control functions that are necessarily implemented in the operation of any network. For the telephone network, the control system is known as Signaling System Number 7 (SS7). As implemented, SS7 comprises a suite of protocols, each of which serves a specific function in controlling the network. For example, the protocol named the Message Transfer Part (MTP) insures that traffic flows through the network by redirecting traffic around failed or overloaded nodes. Another SS7 protocol is the Transaction Capabilities Part (TCAP), which is used in querying any databases that are utilized in controlling the network. Because of its nature as a control system, SS7 is not necessarily limited to use in telephone networks. SS7 and the techniques associated with it are proving useful in more general, computer-based telecommunications networks. Thus, it is clear that network control is an important and potentially complex aspect of telecommunications networking operations.

A critical function in the control of any network, be it a LAN, a PBX, or the Internet, is the management of network resources in order to diagnose and troubleshoot problems, to monitor system performance and to assess traffic patterns and loads. One of the tools commonly available to assist the network engineer in fulfilling a part of this management function is a software application generically known as a tracer. A tracer is a software program that outputs a record of network events (i.e., a trace) in order to aid the engineer in troubleshooting network operations. Due to the variety of technologies that contribute to a modern telecommunications network, a network engineer may be required to utilize a broad array of tracer programs in order to troubleshoot and diagnose problems that can occur in the various aspects of the network. A tracer used to query a telephone network necessarily obtains different information than a tracer used to query a LAN. Moreover, because a given type of network (e.g., LAN) may be manufactured by multiple vendors, each of whom may choose different protocols for use within the network, tracer programs must interact with a wide variety of telecommunications protocols. The network engineer must be conversant with the operation and utilization of many tracer programs interacting with a variety of protocols in order to implement the required network management functions.

Co-pending patent applications Ser. No. 09/540,184 and Ser. No. 09/540,183 describe systems, methods, and a Catalog Definition Language (CDL) by which a plurality of tracers can be unified into a common tool-set to provide a coherent and consistent view of the decoding of tracer output from a plurality of tracers. These co-pending patent applications also describe the system and method by which a plurality of telecommunication protocols that are integrated within any tracer can be decoded to provide a contextual view of tracer events to facilitate the diagnostic process. Because of the generality and flexibility of the system and methods of the invention based on CDL, it becomes feasible to unify many tracers within a single tool while simultaneously decoding a plurality of telecommunication protocols. Since the invention can accommodate many tracers and telecommunication protocols, referred to as catalogs, the invention can support the growth of a large number of tracers and protocols. What is needed is a system and method to accommodate scalability of the CDL-based invention to allow for growth in the number of protocols that the tool can support as well as to allow for efficient utilization of computing resources.

Further, because of the complexity of the telecommunication protocols, the diagnosis of network problems occurring in network elements (NEs) can often require the attention and expertise of multiple technicians/network engineers for timely and efficient diagnosis. Depending on the complexity of a NE (such as a Siemens EWSD switch), an expert in one aspect of the NE is not necessarily be an expert in other aspects of the NE, and a collective collaborative trouble-shooting effort is often required. Further, these experts may be geographically remote from one another. Thus, a system that provides a common basis and facilitates collaboration between users and experts is a desirable asset.

SUMMARY OF THE INVENTION

It is therefore an object of the present invention to provide a system and method that unifies and integrates digital telecommunication systems' tracer diagnostics based on the use of a catalog definition language, CDL, and to leverage this invention to provide a scalable system to accommodate growth.

To effect scalability, a preferred embodiment uses client/server technology. This technology is already in common usage and is well-known by those skilled in the art. Thus, by its use, a catalog library can be centralized at the server level, and growth in the number of catalogs (or protocols) is facilitated. This technology also allows multiple users to concurrently utilize the services of an integrated trace analysis system that is server resident. Although client/server is a technology in common usage and is well-known by those skilled in the art, the object of the present invention applies to the usage of a CDL-based integrated tracer analysis system within a preferred embodiment client/server paradigm.

It is another object of the invention to provide any single user with the capability to access a plurality of iTAS servers. This capability not only enhances scalability but may also be used to satisfy iTAS requirements of any given locale.

The use of multiple iTAS servers can be readily achieved within a distributed computing environment. Distributed computing is already in common use and well-known by those skilled in the art. However, the object of the present invention applies to the usage of a CDL-based integrated tracer analysis system within a distributed network. The method of iTAS within a distributed computing environment will allow any number of users to decode telecommunication trace results from remote networked sites.

It is another object of the present invention to provide a common basis for handling tracer decoding and analysis such that collaboration between users to troubleshoot network elements such as a Siemens telephony switch (EWSD) is facilitated.

The invention provides a distributed and scalable system for collaborative decoding of telecommunications tracer information originating from a plurality of network elements on a network and using a plurality of telecommunications protocols. The invention comprises an integrated trace analysis system (iTAS) application, which contains one or more Catalog Definition Language (CDL) catalogs, each protocol being defined by one or more CDL catalogs; an iTAS relational database, used to store the catalogs and provide the iTAS application with configuration parameters and administrative services; and one or more iTAS domains, which further comprise one or more iTAS application servers having near identical iTAS data in their respective file systems and databases. The iTAS application has a CDL based decoder engine, which is reentrant, and the iTAS application is deployed using distributed computing technology and using a client/server architecture.

The invention leverages a unified and integrated trace decoding tool into a client/server distributed system, thereby facilitating a scalable system that also allows multiple users to decode telecommunication trace results from a plurality of remote networked sites. Using this distributed system, users can also more effectively collaborate in troubleshooting a telecommunication network element using tracers. The client/server distributed system and method for decoding telecommunication tracer information can originate from any telecommunication network element and utilize any industry standard or proprietary telecommunication protocol. Although client/server distributed systems are well known by those skilled in the art, this invention specifically leverages this technology to the application of a unique CDL-based trace decoding system that further enhances the systems' functionality.

There are several ways in which iTAS can be packaged and deployed. In one embodiment, the iTAS software is installed and executed on a desktop graphical-interface based (GUI-based) PC (personal computer) or equivalent. The catalogs that the software requires can be stored on the local PC file system. If the PC is connected to a local area network (LAN), the catalogs can be stored and retrieved from a file server that is located on the LAN or on a WAN (wide area network) that the PC resides in. In another embodiment, the iTAS GUI executes on a client workstation PC. The preferred embodiment of the GUI is to implement the GUI such that it functions within the confines of most commercially available browsers, for example Microsoft's Internet Explorer. This embodiment of a client GUI allows iTAS to have the potential for multi-platform inter-operability on the client side. The browser-based GUI provides access to a back-end application server that executes the services of iTAS invoked by the user via the GUI.

Both the client and back-end iTAS application server are on a network (LAN/WAN). The application server file system acts as the repository for the catalogs that iTAS requires for decoding. These catalogs can be in text format or in a compiled binary format. Storage in a binary format avoids run-time compilation and is the preferred format. Thus, by centralizing the catalog library for any given iTAS application server, scalability in the growth of the library is facilitated. Further, this server is concurrently accessible by multiple users who have access to the LAN/WAN in which the iTAS application server is located. In addition, multiple iTAS application servers can be deployed in a LAN or across an Intranet/Internet to further enhance scalability. The Intranet as known by those skilled in the art of networking is typically a WAN in which more than one geographically dispersed LAN's are interconnected using routers. Another embodiment/variation in the packaging and deployment of iTAS is to use the client/server technology not only within an Intranet but also within the Internet as well. Thus for maximum scalability and flexibility, the preferred embodiment of iTAS is to use client/server technology within a distributed Intranet and Internet network. Further, to achieve multi-platform inter-operability, the preferred embodiment of the client is to utilize a browser-based GUI.

In accordance with the invention a single integrated trace analysis tool provides consistent and coherent display formats which facilitate collaboration. Further, capabilities generated by the CDL-based tracer analysis system can also optionally facilitate collaboration. Co-pending patent application Ser. No. 09/741,229 entitled Method and System of Displaying Telecommunication Trace Diagnostic Information provides a description of a generic iTAS graphical user interface display and functionality usable in a preferred embodiment of the invention.

Use of client/server and distributed computing technologies in the invention allow a plurality of users to concurrently decode traces using a single server platform on which an integrated trace analysis system (iTAS) exists, and will also allow multiple servers to be used by any given user. To accomplish decoding concurrency on a single iTAS platform, the CDL based decoder engine has executable CDL code that is reentrant. Co-pending patent applications Ser. No. 09/540,184 and Ser. No. 09/540,183 more fully describe the CDL (catalog definition language) and the system and methods of the integrated tracer analysis system.

According to the invention, an integrated trace and analysis system includes a plurality of CDL catalogs (i.e., program modules), wherein one or more catalogs define a particular protocol. For example, the ISUP protocol in the suite of SS7 protocols requires a minimum of two catalogs, whereas other SS7 protocols only require one catalog. The CDL used in defining and expressing catalogs is disclosed in co-pending patent application Ser. No. 09/540,184. A catalog can be compiled and executed under the control of a decoding engine and consists of a set of frames that contains the instructions (i.e., operation codes or op-codes) to be executed to effect decoding. Catalogs are compiled and executed under the control of a parsing and decoding engine.

A trace is a time sequence of events that occurs within a NE, such as a telephony switch, and is captured to a log file by a tracer program that executes on the NE. Tracers (i.e., tracer programs) capture traces and are activated and de-activated on the NE by an engineer/administrator. The trace file results from the execution of the tracer, and typically is in either hexadecimal or binary format. The trace file is provided as input to the decoder engine for decoding.

A catalog encoding process disclosed in co-pending patent application Ser. No. 09/540,183 is responsible for the generation of CDL catalogs. The catalog encoding process utilizes one of two methods for the generation of catalogs. One method utilizes a code generator to automatically generate catalog modules. The code generator accesses an electronic data source such as a relational database that contains the information required to enable catalog generation. The other method is to manually encode catalogs utilizing, for example, a text editor. The generated catalogs are stored in a file system (which may be implemented in a database), and a relational database is used in the management and administration of a library of catalogs.

The invention is a distributed system and method usable by multiple and concurrent users for decoding telecommunication tracer information originating from any telecommunication network element and utilizing any industry standard or proprietary telecommunication protocol. The distributed system can include a plurality of integrated trace analysis system application servers connected to a network, such as a WAN or the Internet. Each application server provides a CDL based decoding service wherein tracer data that includes a plurality of individual events provided by a telecommunications network element can be decoded. A tracer that executes on a telecommunication network element is used to produce tracer data wherein the individual events in the trace data can utilize one or more telecommunication protocols. An encoding sub-system on an application server(s) is used to encode each telecommunication protocol into executable CDL programs or catalogs. A plurality of executable CDL programs (that is, catalogs) are created, stored in the application server(s), and used to decode the trace data. A decoder engine that is a part of an application server connected to the distributed network receives trace data from a user specified location. The decoder engine, by using signatures, determines the telecommunication protocol associated with each event in the trace data, and invokes the appropriate executable CDL program stored in the application server to decode the tracer event. A plurality of client workstations is connected to the distributed network. Each client workstation has a graphical user interface that receives output results from said decoder engine and displays these decoded results. Further, the application servers can be configured to reside in a particular domain and each application server within that domain can be administered from any of the said client workstations. These administration services are included as a part of the application server(s) and administrator interaction with these services is effected using a graphical user interface that executes within the confines of a browser on each client workstation as a preferred embodiment. The set of decoding and administrative services comprises the integrated trace analysis system engine that can be referred to as an iTAS engine that executes on the said application server(s).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
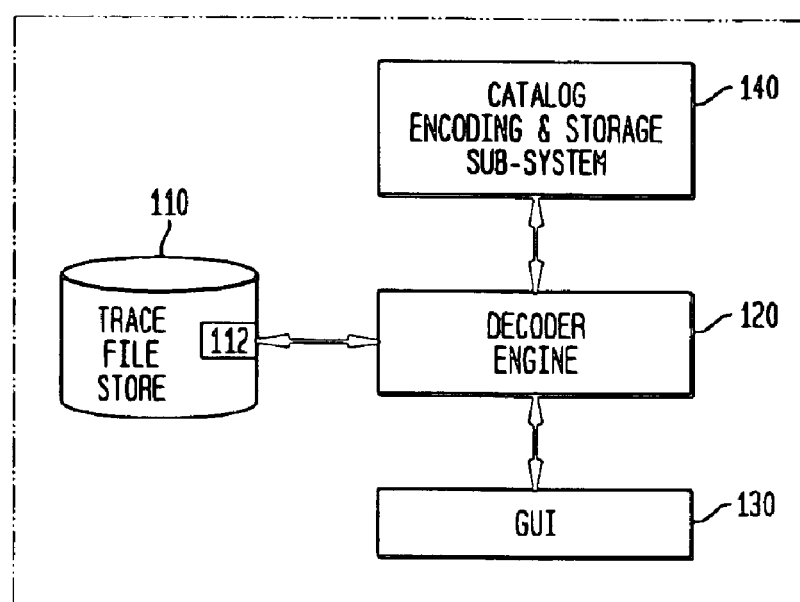
FIG. 1 is a high-level block diagram of the integrated trace analysis system according to the present invention.

Referring now to the drawings, and more particularly to FIG. 1, there is shown a high-level block diagram of the integrated trace analysis system according to the claimed invention. The integrated trace analysis system will be described by way of an example wherein the system encodes catalog information, decodes tracer information, and performs administration functions.

The integrated trace analysis system may be implemented on a desktop personal computer (PC) or a workstation, although other stand-alone or networked microcomputers, minicomputers, or mainframe computers can be utilized to practice the invention to suit particular applications and requirements. In FIG. 1, trace file store 110 represents a file system from which the decoder engine 120 can retrieve captured trace files 112 for decoding. The trace file store 110 can reside on a personal computer (PC) or on a network file server that can be accessed by the decoder engine 120. The trace file 112 is typically in either hexadecimal or binary format that is generated by the Network Element (NE) undergoing investigation.

A trace file 112 from trace file store 110 is selected and provided as input to the decoder engine 120 shown in FIG. 1. The user selects the trace file 112 from the file store 110 using the Graphical User Interface (GUI) 130. The decoder engine 120 retrieves the trace file 112 from the file store 110 and determines the type and format of the trace to be decoded. From the format, the engine determines the set of signatures to be used in parsing the trace file 112. A signature typically consists of a text string, the starting position of the signature value in a line of the trace file, and the length of the signature value. Other signature embodiments are also possible and could be used. These signatures are used to extract the significant values required for decoding the file. The user has the option of specifying the type of trace and related properties such as product type (e.g., the NE), product name, release, operating system (OS) load, version, etc. Typically, the user may select the product type if the integrated trace analysis system has been configured to support multiple NE's. The decoder engine 120 also has the capability to do an "auto-find" for other tracer properties. Although the simplest approach to identifying information such as the release, OS load, and version is to have the user specify this information, this kind of information can also be included within the trace in the form of signatures. The auto-find mechanism scans trace lines in order to find the required signatures. In a preferred embodiment, scanning is not done in a character-by-character fashion but by indexing into lines at particular offsets that are predefined for each of the required signatures. However, if the release, OS load, version and other required information are not included in the trace, then the user has the option to select these properties using the GUI 130.

Figure 2:
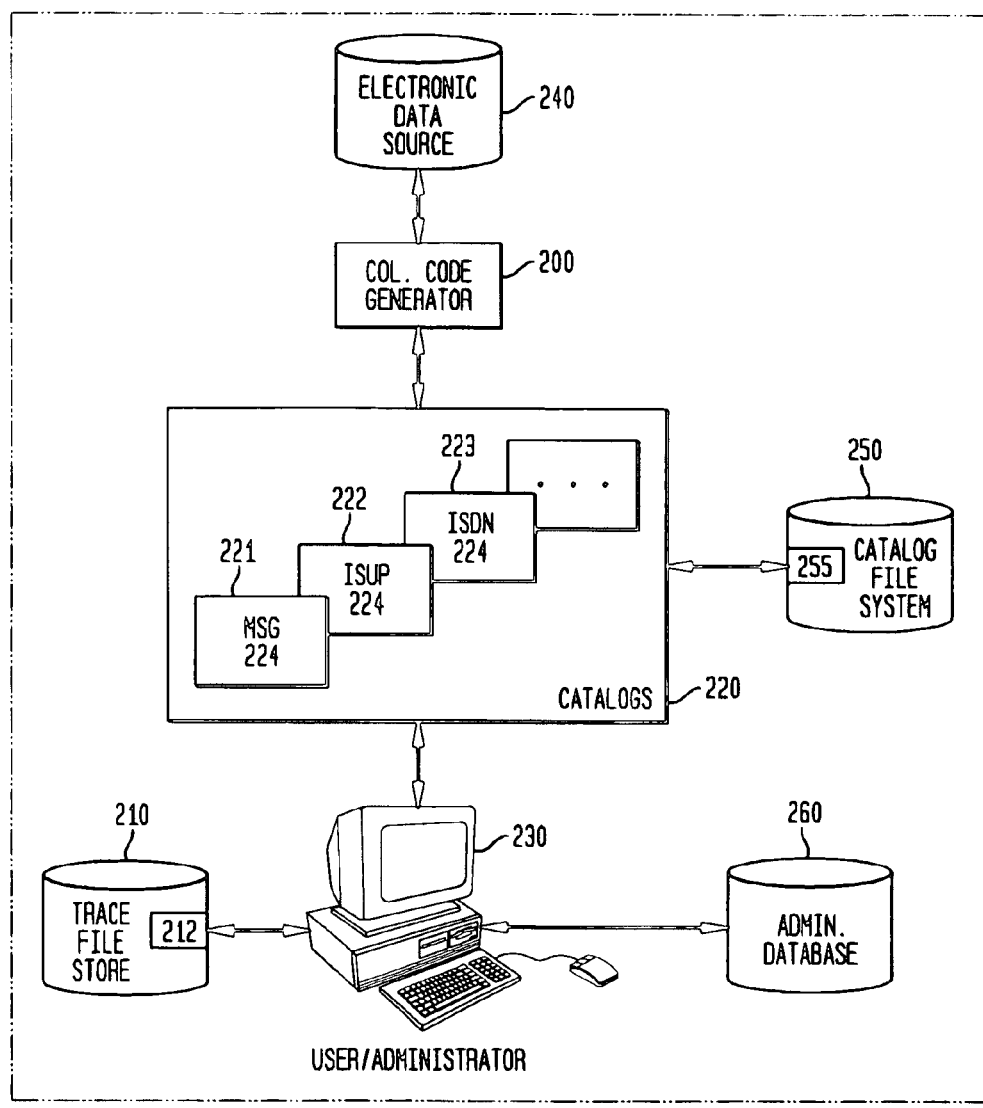
FIG. 2 is a more detailed block diagram of the integrated trace analysis system shown in FIG. 1.

FIG. 2 shows the integrated trace analysis system with additional detail. A more detailed description may be found in co-pending patent application Ser. No. 09/540,183. To perform decoding, the decoding engine that executes on the platform 230 determines, selects and compiles the required catalogs 221, 222 and 223 that have been generated by and stored in the catalog encoding and storage subsystem 250. While only three catalogs 221, 222 and 223 are shown, those skilled in the art will recognize that this is merely illustrative and that there may be more or less than three catalogs. The catalogs, 221, 222 and 223 are encoded in CDL using the code generator 200 that generates from an electronic data source 240, such as a relational database, or are manually encoded. During decoding, the decoder engine that executes on platform 230 scans and extracts the events from the trace 212. For each event, the decoder engine 230 determines one of the catalogs 221, 222, 223 to be used, and the particular frame in the catalog that corresponds to the event is executed. The decoding results thus obtained are displayed on the GUI 130 that executes on platform 230.

The encoding and file store subsystem 140, of FIG. 1, consists of an electronic data source 240, a CDL code generator 200, a set of catalogs 220, a catalog file system 250, a platform 230 (such as PC or workstation), and an administrative database 260. This sub-system is used to create, modify and store catalogs 221, 222 and 223. Catalogs are modified over time as NEs evolve to meet new requirements. The code generator 200 creates catalogs 221, 222 and 223 using the management and administration functionality within the integrated trace analysis system that is available only to an administrator via the GUI on 230. Alternatively, the uncompiled text form of catalogs can be manually edited using any commercially available text editor.

The decoder engine that runs on the platform 230 may utilize a convention for expressing catalog file names 224 and for finding catalogs 221, 222 and 223 within the catalog file system 250. Catalog file names 224 stored within the catalog file system 250 are preferably identified using the name of a protocol class and the name of a sub-protocol class or an event class. For example, the SS7 protocol class has a sub-protocol class of ISUP, giving a catalog name, for example, of SS7_ISUP. Similarly, for a Siemens EWSD NE, a catalog name could be, for example, CALLP_MSG where CALLP is the protocol class and MSG is the message event class. It is preferred that tracer properties, such as network element, release, OS load, version, catalog name, a root directory name, etc., are used to find a catalog 221, 222 or 223 within the library of catalogs 255 of catalog file system 250. Thus, for example, if the root directory name is C:/iTAS and the tracer properties are network element= EWSD, release=17.0, load=Freeze, Version=0, and Catalog Name=CALLP_CMD, then the path to the CALLP_CMD catalog could be:

Path=C:/iTAS/EWSD/17.0/Freeze_0/CALLP_CMD.

The GUI at 230 receives user or administrative input requests, and outputs the results of the requests using the GUI. User requests can be, for example, to extract event data, to decode event data within a trace file, to filter frames based on a Boolean expression, to search for strings, etc. Administrative requests can be, for example, to add a new catalog, to promote a tested catalog to the run-time environment, to add or remove a catalog administrator, etc.

Figure 3:
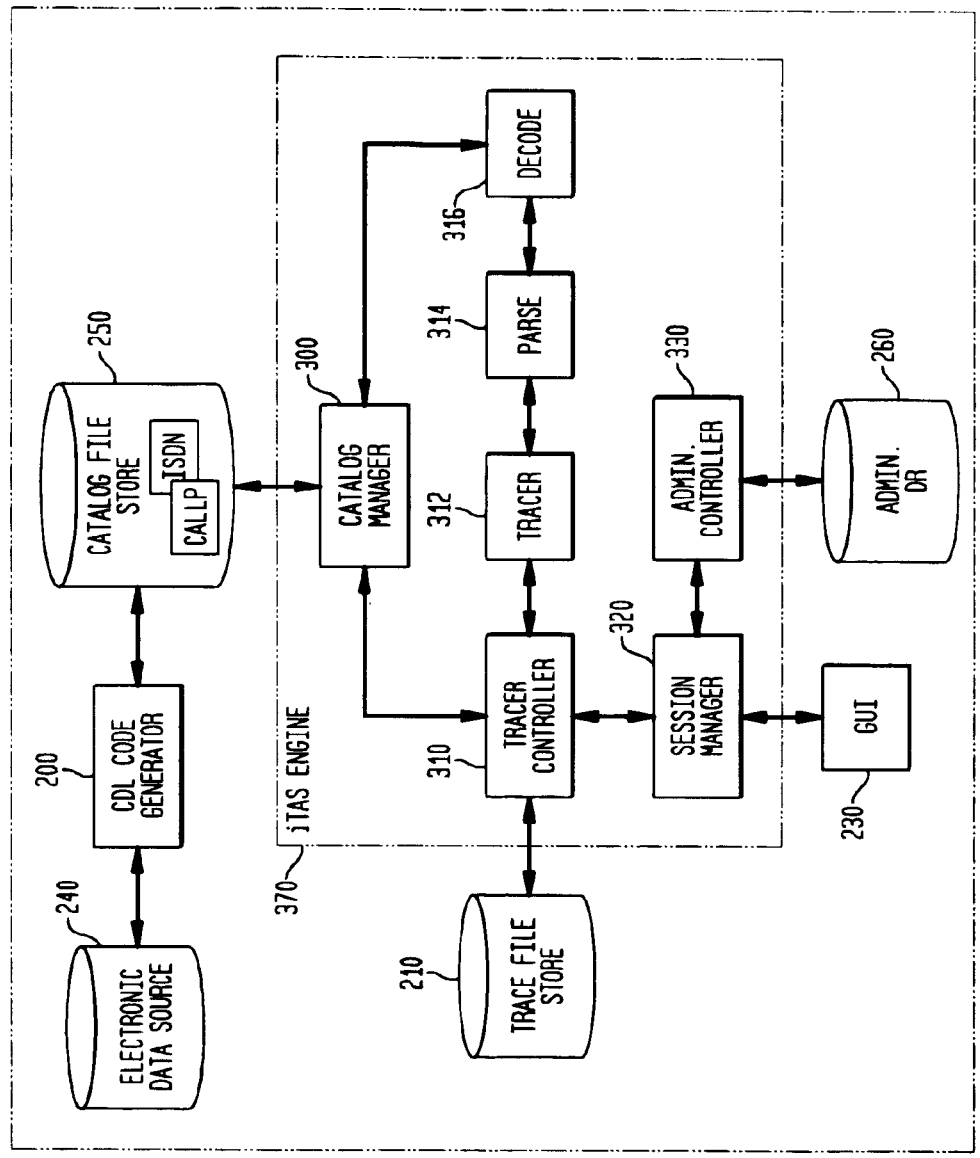
FIG. 3 is a block diagram example that illustrates the manner in which the integrated trace analysis system according to the invention is implemented in a distributed system having multiple servers.

A more detailed illustration of the integrated trace analysis system (iTAS) is provided in FIG. 3. The decoder engine 120 of FIG. 1 is considered to consist of a catalog manager 300, a trace controller 310, a tracer 312, a parser 314, a decoder 316, and a session manager 320. A more detailed description of the decoder engine may be found in co-pending patent application Ser. No. 09/540,183. The iTAS engine 370 consists of the decoder engine (120 in FIG. 1) in combination with an administration controller 330 whose function is to implement the administration services required by iTAS. The administration controller 330 references the administration database 260 in order to implement administration requests. In a preferred client/server embodiment of iTAS, the GUI at 230 executes on a client workstation, preferably within the confines of a browser to obtain multi-platform inter-operability at the client level. However, this only reflects a preferred embodiment. The back-end server executes the decoder engine 120 in conjunction with the code generator 200 and the administration controller 330. The administration database may or may not be resident on the same server. In this preferred embodiment, multiple users can concurrently access the same server to perform iTAS related tasks. Further, within the context of a distributed computing environment, one or more users can each concurrently access and use multiple iTAS servers.

Figure 4:
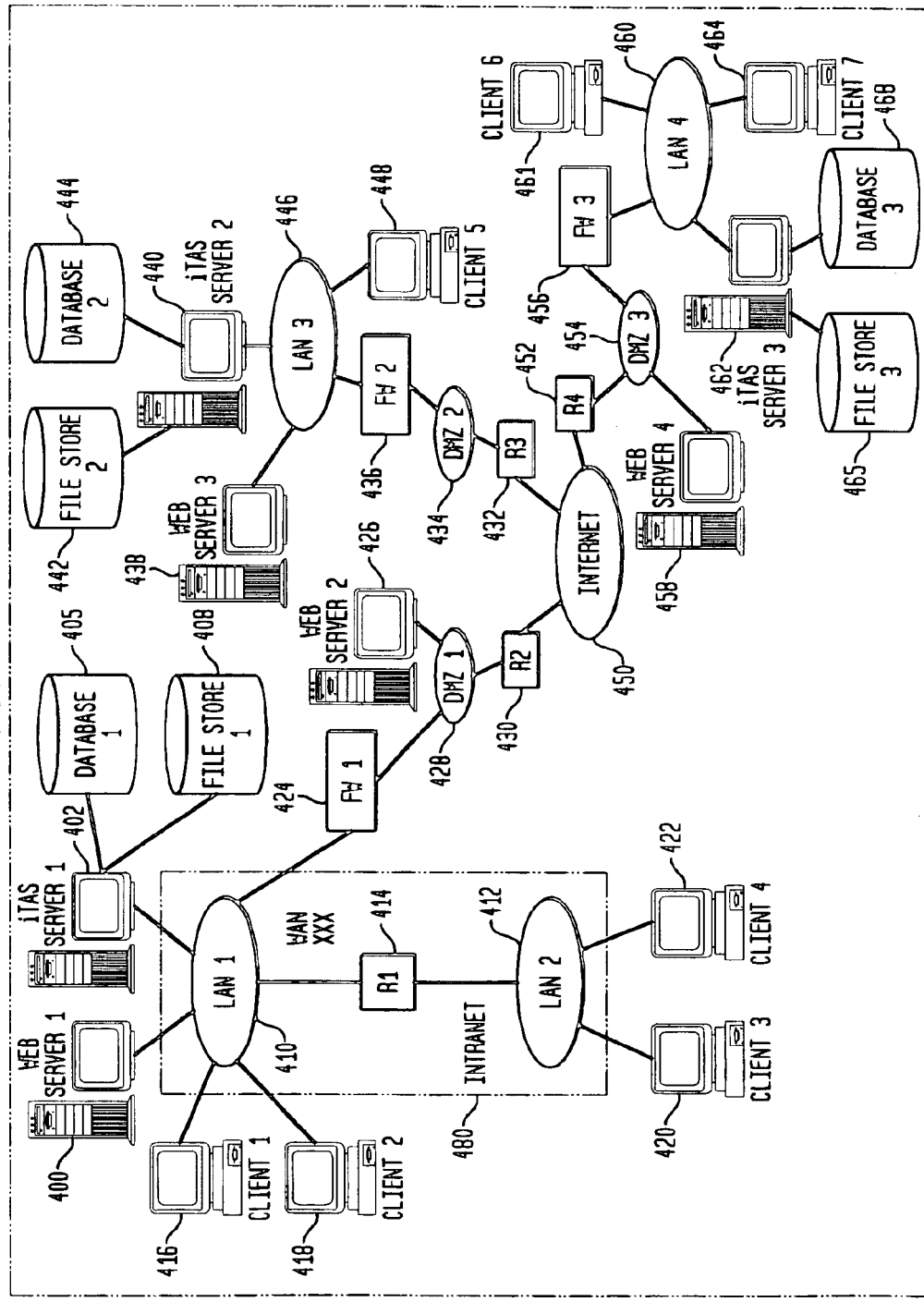
FIG. 4 is a more detailed block and flow diagram showing the process of decoding from one of the network iTAS client workstations in a distributed computing environment.

The present invention applies to the implementation of a CDL-based integrated trace analysis system, iTAS, in a distributed system, as schematically illustrated in FIGS. 3 and 4. The systems shown in FIGS. 3 and 4 are used for illustration purposes only and do not serve to limit the invention, as will be understood by those skilled in the art. The stand-alone system of FIG. 2 works quite well but implements the iTAS engine 370 on each user's client workstation. This restricts usage of the iTAS engine 370 to only one technician/engineer and is not amenable to multi-platform operability. Nor will such a system have the improved speed that could be obtained from a high performance server. Since telecommunications systems are quite large and widely distributed, the system approach illustrated in FIG. 4 offers many advantages, including 1) Scalability of catalog libraries to encompass a wide range of telecommunication protocols.

2) More efficient utilization of computing resources by centralizing iTAS services to centralized high performance servers that may also provide a computing speed performance advantage assuming that network speed performance is satisfactory.

3) Use of iTAS services by multiple technicians/engineers at different locations in the telecommunications network, where such users have access to an intranet/internet and a web browser, and 4) Collaborative troubleshooting of network elements by two or more engineers able to use tracers and decoding thereof on a common telecommunications network, particularly in instances where decoding produces large files and local iTAS servers are available so that these large files need not be transmitted over WAN's.

There are many possible variations of a distributed network in which iTAS can be deployed, and FIG. 4 illustrates only a sample to be used in describing a generic deployment.

With reference to FIG. 4, local area networks 410 and 412 connected via router 414 (R1) illustrate a wide area network 480. All services and resources in these two LAN's 410 and 412 can be made available to workstations such as 418, 420 and 422 that resides in these LANs without the necessity of gaining access via a firewall (FW). Thus with an iTAS-enabled browser, the services provided by iTAS server1 402 can be directly accessed via the web server1 400 by the clients 418, 420 and 422. Should the clients wish access to the services provided by iTAS Server3 462 this access is achieved by routing the requests through a firewall 424, routers 430, 452 and the Internet 450 to web server4 458. Web server4 458 is in the de-militarized zone (DMZ3 454) for LAN4 460, which hosts iTAS server3 462. Web server4 458 is therefore externally accessible via the Internet 450. Similarly, a client such as 448 on LAN3 446, and clients such as 461 and 464 on LAN4 460 can access web server2 426 in DMZ1 428. With access to web server2 426, the services of the iTAS server1 402 can be made available to these external clients that must be routed via the Internet 450. However, because there is no web server in the DMZ2 434, no external clients can access the services provided by iTAS server2 440. The only client that can have access to iTAS server2 440, is client5 448 which is in the same LAN (LAN3 446) as web server3 438.

In general, in order for a browser-based iTAS client to have access to the services of an iTAS server one of two circumstances must exist. First, the iTAS client can have direct access to a web server that is on a LAN or Intranet that hosts the iTAS server (e.g. iTAS clients on Intranet 480 have direct access to web server1 400 and thereby to iTAS server1 402, or iTAS clients on LAN3 446 have direct access to web server3 438 and thereby to iTAS server2 440). Second, where the iTAS server is protected by a firewall that also protects other network resources (e.g. FW2 protecting iTAS server2 440 and the other resources on LAN3, or FW3 456 protecting iTAS server3 462 and the other resources on LAN 4, or FW1 424 protecting iTAS server1 402 and the other resources on Intranet 480) the iTAS client can have access to the iTAS server via a web server that is exposed to all external users in a DMZ adjacent to the firewall (e.g. via web server4 458 at DMZ3 for access to iTAS server3 462 across firewall FW3 456, or via web server2 426 at DMZ1 for access to iTAS server1 402 across firewall FW1 424, but not to iTAS server2 440 across firewall FW2 436 because there is no web server at DMZ2 434).

Alternatively, the web server and iTAS server could be on the same platform and be resident in the DMZ. In such instances, other means of server protection may be put in place if desired.

The iTAS services can be hosted on a) a single platform that has facilities for a web server, an iTAS application server and an iTAS database server, or on b) multiple platforms having these facilities in combination.

With the distributed system shown in FIG. 4, multiple users at various locations may decode telecommunications traces in order to troubleshoot a telecommunications network problem. These users can collaborate on diagnosing any given problems on a NE if desired. The user has the option to transmit the decoded tracer information or the URL (Uniform Resource Locator) that provides the location of the trace file(s). The decision on whether to send the URL or the decoded trace file would depend on the size of the decoded trace file results versus the size of the trace file. The decoded output for some trace files can be large, in the order of megabytes, and in such cases it may be more efficient to use the URL. At a minimum, the trace file itself must be uploaded to the target web site for decoding at that site by the technician(s) or engineer(s) with whom collaboration is sought. An alternative approach is to save the decoded trace in a database and provide access to this information to multiple users to further facilitate collaboration.

In a preferred deployment of the iTAS server in a distributed computing environment, there is an iTAS administration database server 260, 405, 444, 460 associated with each iTAS application server. The database server may reside on the same platform as the application server or on a separate platform if desired. It is not the intent to provide a detailed description of the entity relationship design of the iTAS relational database because this can be accomplished easily and rapidly by those skilled in the art. Rather, it is the intent to describe the main functionality requirements that it satisfies.

One aspect of the database is to provide the iTAS application software with configuration parameters such as, but not limited to, the network elements and the tracers that are supported in conjunction with their relevant load, release, and version properties and the definition of the signatures that are used in parsing any specific trace file. Thus, with these configuration parameters so specified, the iTAS application software can dynamically configure and re-configure itself without the need for re-compilation.

The other aspect of the database is to provide administration services to the application. The iTAS catalogs are preferably stored in a compiled binary format within a defined structure in the application server's file system. A generic structure is more fully described in co-pending patent application Ser. No. 09/540,184. Although alternative arrangements are feasible, this is the preferred approach since the catalogs are in effect compiled programs that can be required at run-time if they are not already memory resident. Thus, the database maintains the paths needed to find any given catalog within the file system. Another aspect of the database is to store the results of a decoded trace in the database and provide multiple users concurrent access to the decoded trace information via their browser based graphical user interface (GUI) in order to further facilitate collaborative problem solving.

Within the confines of a distributed computing network, iTAS supports the notion of an iTAS domain. The iTAS domain is defined to be a set of one or more iTAS application servers that are required to have identical (or near identical) iTAS data and information in their associated file systems and databases. Thus, for example, referring to FIG. 4, iTAS server1 402 and iTAS server3 462 may be considered to be in the same domain whereas iTAS server2 440, is in another domain. Clients in the same iTAS domain are configured to access the iTAS services provided on the different sub-networks, for example, 480 and 460 in FIG. 4. The utility of this approach lies not only in backup and access redundancy in case a server is off-line, but also in support of collaborative troubleshooting where it is more efficient to have the different iTAS sites/locations perform their own decoding or, alternatively, to share decoded trace information via an ITAS database. Another benefit of the iTAS domain concept is the fact that changes to a server's file system or database will eventually be replicated or propagated to the other databases and file system within the domain. Most commercial databases such as Oracle and SQL server support some form of replication. However, the preferred approach within iTAS is to replicate the iTAS file system and database by using a multi-threaded GUI from which an administrator can request changes or additions. Administrative change or additions may affect iTAS files such as catalogs and other data and information within the administration database. Such data may be, but not limited to, domain information, administrator account information, catalog information, signature information and context sensitive help information for the plurality of events that can occur within and across the plurality of tracer data results.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A distributed system for decoding telecommunication tracer information originating from any telecommunication network element and utilizing any industry standard or proprietary telecommunication protocol comprising:

a Catalog Definition Language (CDL) based trace decoding software tool that executes on an application server that is deployed within a distributed network for decoding trace data provided by any telecommunication network element, wherein the trace data for a particular telecommunication network element is produced by a tracer and is comprised of a plurality of individual events utilizing one or more telecommunication protocols;

an encoder that creates and stores in a file system a plurality of executable CDL programs used to decode the trace data, any particular telecommunication protocol being defined by one or more said CDL programs;

a plurality of client workstations connected to the distributed network wherein each of the said workstations can access one or more application servers, each said application server having a CDL and signature based decoder engine that is capable of invoking one or more of said executable CDL programs to decode the trace data; and a graphical user interface for each of said plurality of client workstations that receives an output from said CDL and signature based decoder engine and displays the decoded results in a consistent format across all said tracers whose trace data is decodable by said software tool.

2. The distributed system for decoding telecommunication tracer information of claim 1, said system having a plurality of application servers.

3. The distributed system for decoding telecommunications tracer information of claim 2, wherein said trace decoding software tool accommodates growth in said library of CDL encoded catalogs of telecommunications protocols.

4. The distributed system for decoding telecommunications tracer information of claim 2, wherein each of said plurality of client workstations can have concurrent access to the decoding services provided by a single application server, access concurrency being accomplished by reentrant code in said executable CDL programs.

5. The distributed system for decoding telecommunications tracer information of claim 2, wherein said trace decoding software tool provides context sensitive information for the plurality of events in said plurality of trace data.

6. The distributed system for decoding telecommunications tracer information of claim 2, wherein said trace decoding software tool is so deployed within a distributed computing network that multiple users, each working from a different one of said client workstations, are able to collaborate on the diagnosis of problems captured within tracer data from a particular network element.

7. The distributed system for decoding telecommunications tracer information of claim 2, wherein tracer diagnostics within a domain can be centrally administered from any client workstation that has access to all application servers that reside in the domain, said domain being supported by both the distributed network structure and the configuration of the said application servers.

8. A distributed and scalable system for collaborative decoding of telecommunications tracer information originating from a plurality of network elements on a network and using a plurality of telecommunications protocols. comprising:

an integrated trace analysis system (iTAS) application, said application containing one or more Catalog Definition Language (CDL) catalogs, each said protocol being defined by one or more CDL catalogs;

an iTAS relational database, said database being used to store said catalogs and provide said iTAS application with configuration parameters and administrative services;

one or more iTAS domains, each said domain further comprising one or more iTAS application servers having near identical iTAS data in their respective file systems and databases;

wherein said iTAS application has a CDL based decoder engine, said decoder engine being reentrant and wherein said iTAS application is deployed using distributed computing technology and using a client/server architecture.

\* \* \* \* \*